Nov. 24, 1970     P. H. STRACHAN     3,543,044
AUTOMATIC BATTERY USE TIMER
Filed Jan. 24, 1969
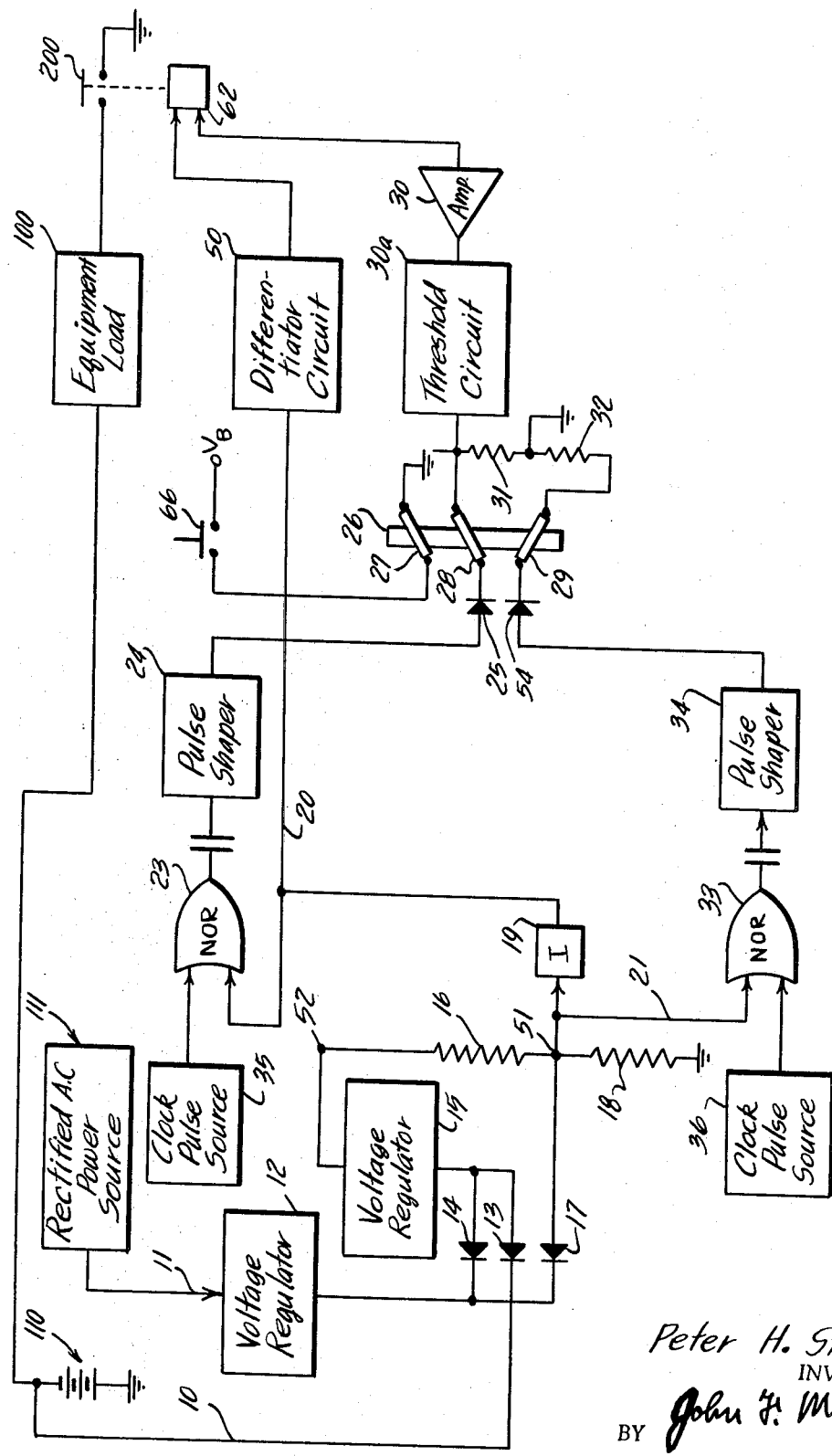
Peter H. Strachan
INVENTOR.
BY John F. Miller
Agent
John M. Lear
Attorney 3,543,044
AUTOMATIC BATTERY USE TIMER
Peter H. Strachan, San Rafael, Calif., assignor, by mesne assignments, to the United States of America as represented by the Secretary of the Navy
Filed Jan. 24, 1969, Ser. No. 795,772
Int. Cl. H02j 9/00
U.S. Cl. 307—66                                    3 Claims

ABSTRACT OF THE DISCLOSURE

The output voltage of an emergency battery power source in a load circuit controls gating means to select a clock pulse source which drives a saturable core to saturation in a predetermined length of time. Saturation of the core results in a signal to relay means for switching the battery power source out of the load circuit to limit battery drain.

BACKGROUND OF THE INVENTION

The invention is in the field of automatic power supply timing devices. In the prior art various timing devices have been used to measure or control the length of time that power is supplied from a particular power source. Heretofore such devices have suffered from various deficiencies such as excessive complexity, cost, weight, and susceptibility to environmental hazards such as shock, heat, dirt, etc., when used in severe applications. Applicant has solved the problems associated with prior art devices by using the saturable magnetic core to achieve circuit simplification and ruggedness in an automatically activated timing device.

SUMMARY OF THE INVENTION

An emergency battery power source is used to operate equipment when the usual A.C. power source fails. The applied battery voltage is used to selectively gate a clock pulse source to a winding on a saturable magnetic core which is saturated in one direction. When a sufficient number of shaped clock pulses have been gated to the winding, the core is saturated in the opposite direction. This reduces the impedance of the winding and permits a clock pulse to develop a voltage to operate a relay which disconnects the emergency battery power source from the equipment load.

BRIEF DESCRIPTION OF THE DRAWING

The drawing is a circuit schematic of the invention.

DESCRIPTION OF THE PREFERRED EMBODIMENT

One application of the invention is for controlling the length of time that an emergency battery power source is used to operate equipment that is ordinarily operated by an A.C. power source. The drawing illustrates such an application. Here an emergency battery power source 110 for a load comprising equipment 100 is connected to the automatic timing circuit of the invention by a lead 10. The timing circuit is held inactivated when the rectified alternating current power source 111, which ordinarily powers the equipment, is on. The rectified A.C. voltage is applied through a lead 11, a regulator 12, and a diode 17 to a terminal 51 in a voltage divider comprising two resistors 16 and 18 which are connected between a terminal 52 and ground. The A.C. voltage (−5.2 volts in this particular equipment) is also applied through a diode 14 and a voltage regulator 15 to terminal 52. When the A.C. power is on, the voltage at both terminals 51 and 52 is −5.2 volts. When terminal 51 is at a −5.2 volt potential, a "0" signal is applied to inverter 19 which supplies a "1" output signal to an input of a NOR gate 23. The convention used here is to consider a voltage beginning at −1.55 volts and extending more negatively, a "0" signal, and a voltage beginning at −.75 volt and extending more positively, a "1" signal. The "1" signal prevents clock pulses from a source 35 from passing NOR gate 23. A "0" signal from terminal 51 is applied to one input of a NOR gate 33 over a lead 21. This enables clock pulses from a clock pulse source 36 to pass through NOR gate 33, a pulse shaper 34, a diode 54, a winding 29, and a resistor 32 to ground. Winding 29 is on a saturable magnetic core 26 and is wound in such direction that the pulses from source 36 maintains core 26 in a negative state of saturation.

The emergency battery power supply 110 is also connected to terminal 52 through lead 10, a diode 13, and a voltage regulator 15. When the A.C. power supply 111 fails, no voltage is applied to terminal 51 and the only voltage applied to terminal 52 is −5.2 volts from battery 110. The voltage divider comprising resistors 16 and 18 causes a potential of 0.75 volt to appear at terminal 51. This is a "1" signal which blocks NOR gate 33 and is inverted by inverter 19 to apply a "0" signal to NOR gate 23. This enables a train of clock pulses from a clock pulse source 35 to pass through an amplifying pulse shaper 24, diode 25, winding 28, and resistor 31 to ground. Winding 28 is wound on magnetic core 26 in such direction that the clock pulses tend to reverse the direction or polarity of the magnetic flux in magnetic core 26. Core 26 is of a type well known in the art which can be magnetized in incremental steps. Each clock pulse passing through winding 28 will reverse the polarity of the flux in core 26 a discrete amount depending on the amplitude and duration of the pulse and the number of turns in the winding. In this particular application, core 26, winding 28, and the clock pulses are designed so that ten clock pulses will completely reverse the polarity of the flux in magnetic core 26, driving the core into saturation in the opposite direction. As core 26 saturates, the impedance of winding 28 drops to a very low value so that a clock pulse causes a voltage of relatively large amplitude to be generated across resistor 31. This voltage passes through a threshold circuit 30a and produces an output signal from amplifier 30 which switches a latching relay 62. Relay 62 is connected to open a switch 200 to switch emergency battery power source 110 out of the load circuit. When the A.C. power supply is turned back on, a signal over a lead 20 to a differentiating one shot multivibrator 50 supplies an unlatching signal to relay 62.

In one particular application of the invention, clock pulse source 35 has a frequency of ten pulses per hour and pulse shaper amplifier 25, winding 28, core 26, and resistor 31 are such that ten clock pulses will reverse the flux polarity in core 26 so that battery 110 will be switched out of the load circuit after one hour of use. Source 36 generates one clock pulse every 48 minutes to maintain core 26 in its initial condition of saturation. Obviously one or more of the components could be altered to change the switching time by any factor desired.

Winding 27 on core 26, switch 66, and a voltage source $V_B$ are provided for initially saturating core 26 in the desired direction.

The invention, while simple in concept, is superior to prior art devices in compactness, ruggedness, reliabiilty, and precision. It can be constructed of solid state components to withstand the shocks of military and other applications. It it highly flexible in that it can be easily modified to serve any timing requirement. It functions automatically when power fails and deactivates itself automatically when power is restored.

I claim:
1. In a power supply timing device, the improvement comprising:
a regular power supply source, an emergency power supply source, timing means for timing the supply of power from said emergency source, switch means for switching said emergency power supply off, activating means whereby said timing means activate said switch means when said emergency power is supplied for a predetermined length of time, said timing means comprising a saturable magnetic core, winding means for saturating said core in one direction, and winding means for saturating said core in the opposite direction, said activating means activating said switch means when said core is saturated in the opposite direction.

2. The apparatus of claim 1, and including a first clock pulse source for supplying a clock pulse train to said winding for saturating said core in said one direction, and a second clock pulse source for supplying a clock pulse train to said winding for saturating said core in said opposite direction.

3. The apparatus of claim 2, and including first gating means for gating said clock pulse train from said first clock pulse source, and second gating means for gating said clock pulse train from said second clock pulse source.

References Cited

UNITED STATES PATENTS 2,106,968  2/1938  Dannheiser _____ 320—38 X

ROBERT K. SCHAEFER, Primary Examiner

H. J. HOHAUSER, Assistant Examiner

U.S. Cl. X.R.

320—38